(12) United States Patent
Bennett et al.

(10) Patent No.: US 8,160,908 B2
(45) Date of Patent: Apr. 17, 2012

(54) SUPPLY CHAIN MANAGEMENT

(75) Inventors: Gail Bennett, Jersey City, NJ (US); James Milk, Long Valley, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 443 days.

(21) Appl. No.: 12/195,945

(22) Filed: Aug. 21, 2008

(65) Prior Publication Data
US 2010/0049575 A1    Feb. 25, 2010

(51) Int. Cl.
*G06Q 30/00*    (2006.01)
(52) U.S. Cl. ......... 705/7; 705/8; 705/9; 705/35; 705/36; 705/37
(58) Field of Classification Search ................ 705/7, 8, 705/9, 35, 36, 37
See application file for complete search history.

(56) References Cited

U.S. PATENT DOCUMENTS

| | | | |
|---|---|---|---|
| 5,911,776 A * | 6/1999 | Guck | 709/217 |
| 7,818,247 B2 * | 10/2010 | Kemp et al. | 705/37 |
| 2003/0055700 A1 * | 3/2003 | Hoffman et al. | 705/8 |
| 2006/0178918 A1 * | 8/2006 | Mikurak | 705/7 |
| 2007/0198437 A1 * | 8/2007 | Eisner et al. | 705/79 |
| 2009/0099879 A1 * | 4/2009 | Ouimet | 705/7 |

* cited by examiner

*Primary Examiner* — Nga B. Nguyen
(74) *Attorney, Agent, or Firm* — Thomas, Kayden, Horstemeyer & Risley, LLP (57) ABSTRACT

An interface to a transactional system of a trading partner provides electronic communications to at least one participant in a supply chain for a product or service provided by the trading partner. The interface provides the electronic communications in a common format used by an interface to the at least one participant's transactional system. The electronic communications include at least automated messages providing a current progress of the supply chain.

20 Claims, 6 Drawing Sheets

SUPPLY CHAIN MANAGEMENT

TECHNICAL FIELD

The present disclosure is generally related to supply chain management and, more particularly, is related to automated supply chain management.

BACKGROUND

A problem in existence today is where individual organizations within a company work in "silos" or separate divisions and communications between organizations and external businesses, such as suppliers, are poor or do not exist.

SUMMARY

One embodiment of an interface to a transactional system of a trading partner provides electronic communications to at least one participant in a supply chain for a product or service provided by the trading partner. The interface provides the electronic communications in a common format used by an interface to the at least one participant's transactional system. The electronic communications include at least automated messages providing a current progress of the supply chain.

One embodiment of an automated supply chain management method of the present disclosure comprises facilitating electronic communications between a trading partner and at least one participant in a supply chain for a product or service provided by the trading partner. The electronic communications are provided in a common format used by an interfaces to the at least one participant's transactional system and the trading partner's transactional system, and the electronic communications comprise at least automated messages providing a current progress of the supply chain.

Other systems, methods, devices, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of exemplary embodiments can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure automate end to end international supply chain management with a newly developed automated supply chain management platform. Generally, a supply chain comprises the acts involved in providing a finished service or product to an end customer from a supplier. In providing this service, one or more acts may actually be performed by more than one supplier. Supply chain management is an approach in managing or overseeing the performance of these acts. With the automated platform of the present disclosure, evolution of a siloed business process to a fully automated end to end business process and platform is enabled, where supply chain management is automatically provided. This provides an oversight of materials, information, and finances as these items move in a process from participants in the supply chain.

Business operations are improved with the exchange of business data and documents electronically. As an example, a business to business (B2B) gateway provides means for external parties to exchange business data and documents with a company. Accordingly, a B2B gateway may provide a comprehensive suite of technology that can be leveraged by different groups of an organization. The B2B gateway supports internal and external integration and business processes in order to provide a common platform in which to operate. In general, a B2B gateway may include multiple components that can be implemented together and be integrated with various technologies, such as Web Services, SOAP (simple object access protocol), Java, application programming interfaces, etc. Further, a variety of transport and security standards may be used including FTP (file transfer protocol), HTTP (hypertext transfer protocol), Web Services, etc. The B2B gateway may enable communication services on multiple access, application, and/or data platforms across a distributed communications infrastructure.

Figure 1A:
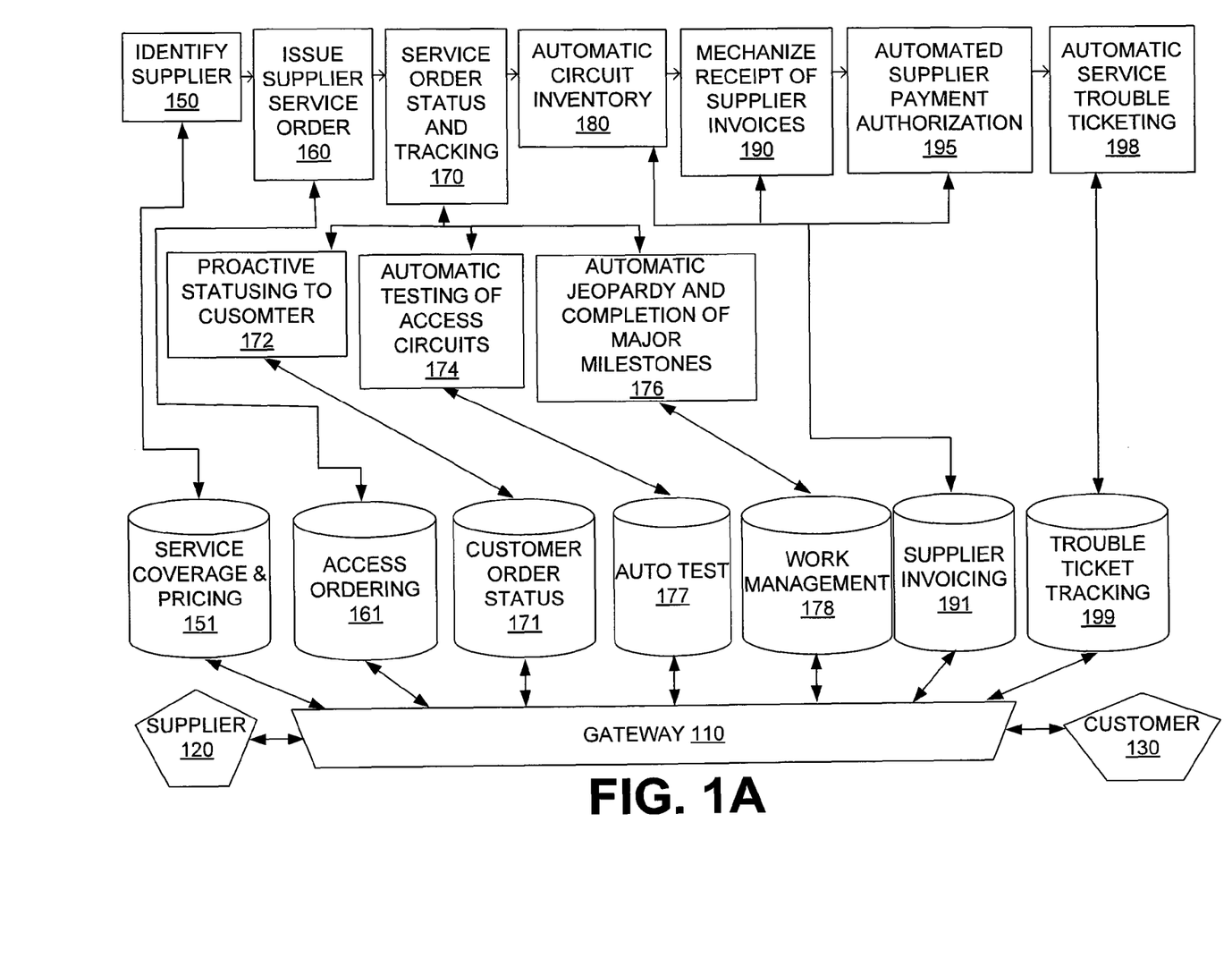
FIGS. 1A-1B are diagrams of a representation of an automated supply chain management gateway in accordance with the present disclosure.
Figure 1B:
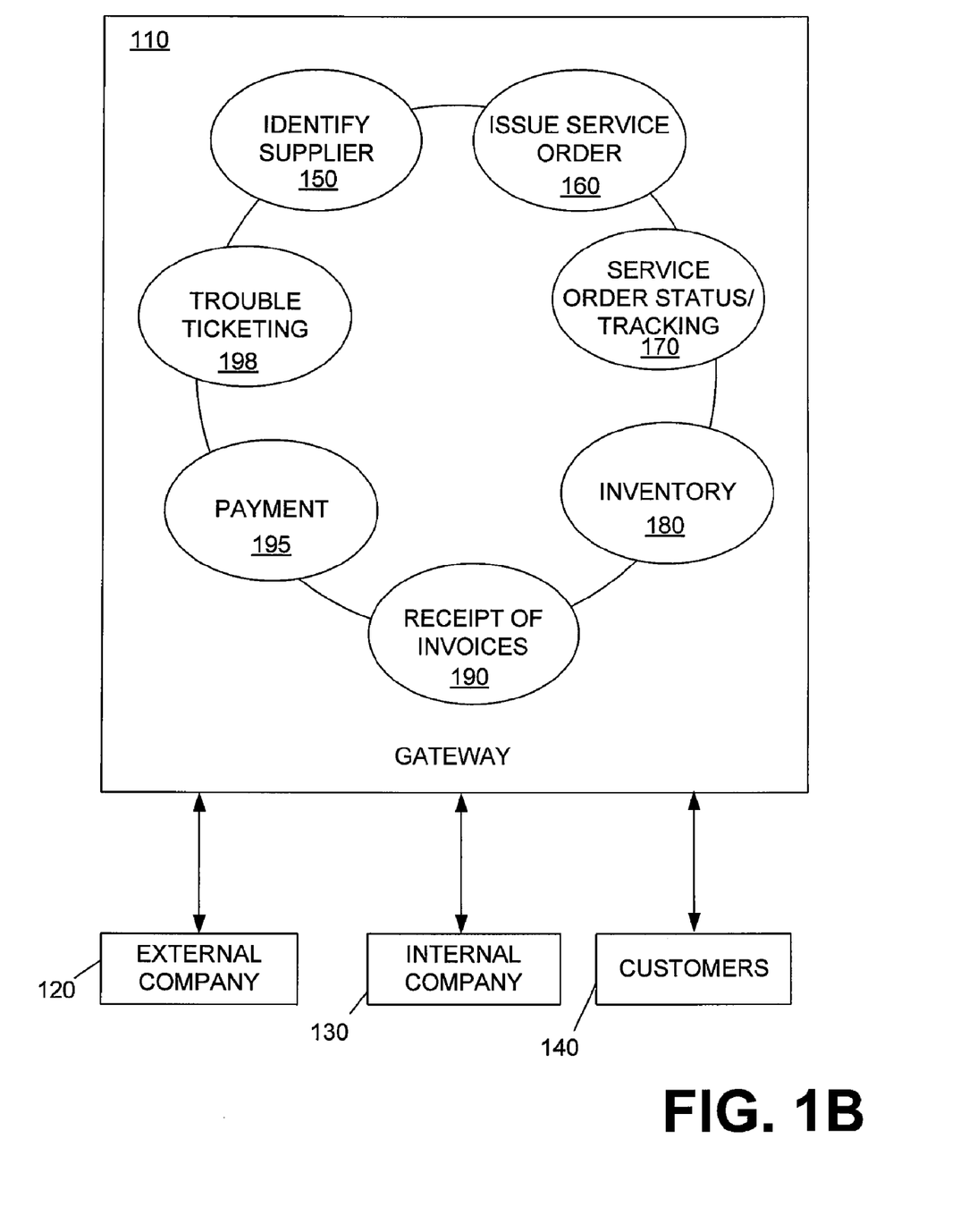

Referring now to FIGS. 1A and 1B, a conceptual representation of a B2B gateway is depicted and is referred as an automated supply chain management gateway. As shown, the automated supply chain management gateway 110 can be accessed by an external company (or trading partner) 120, internal company (or trading partner) 130, and customer(s) 140. As an example, businesses (e.g., company 130) often request another business (e.g., company 120) to supply a service. Further, the other business (e.g., company 120) providing the service may be a global business providing the service internationally. Accordingly, to provide a product or service to an end customer 140, many different businesses may take part in providing the requested product or service from inception of the request to the receipt of the service/product by the customer 140. Coordination of the activities of the different businesses in fulfilling the requested product/service can be cumbersome. Accordingly, embodiments of the present disclosure utilize logic to validate data both upstream (to suppliers) and downstream (to customers) in the end to end process via system automation while setting a benchmark for the establishment of company to company communications standards for multiple trading partners.

To illustrate, one embodiment of the present disclosure addresses the mechanization (via the automated supply chain management gateway) for the following areas or functions: identification of a trading partner 150, such as a supplier, by country (in addition to other pertinent information such as offered technologies, service capabilities, and cost); issue a service order 160; and service order status and tracking 170. As an example, order status and tracking 170 may include proactive automatic statusing 172 to the end customer 140, fully automated testing 174 of access circuit with pass/fail status to the trading partner or supplier (e.g., company 120), and tracking of automatic jeopardy and completion status of major process milestones 176. The automated supply chain management gateway 110 further includes functionality such as maintaining automatic circuit inventory 180 established by country, customer, trading partner, and technology; mechanized receipt of partner invoices 190 for validation against inventory; automated payment authorization to financial systems for accounts payable and general ledger 195; and automatic service trouble ticketing 198 in partner and customer systems including automatic alarm notifications and customer trouble reporting. Within a company, individual subplatforms or sub-units maybe responsible for performing or handling of one or more areas described above as shown in FIG. 1A. These units include service coverage and pricing 151, access ordering 161, customer order status 171, auto testing 177, work management 178, supplier invoicing, 191, and trouble ticket tracking 199. The sub-platforms or sub-units (e.g., network servers or software modules) may be located within transactional systems of participants of the supply chain that interface with gateway 110, in one embodiment.

In earlier systems, an individual company may have interface applications that provide some of these services. However, data or reports that are generated are limited to being consumed by the individual company's applications and are not available to be used by an external company, such as a supplier of the individual company. With embodiments of the automated supply chain management gateway 110, however, the exchange of electronic communications between respective transactional systems of trading partners facilitates supply chain management. Further, embodiments of the automated supply chain management gateway platform may encompass processing events or rules, such as cascading operations, that are processed based on occurrence of earlier operation(s). For example, a rule may take a defined action on a specific processing event.

Figure 2:
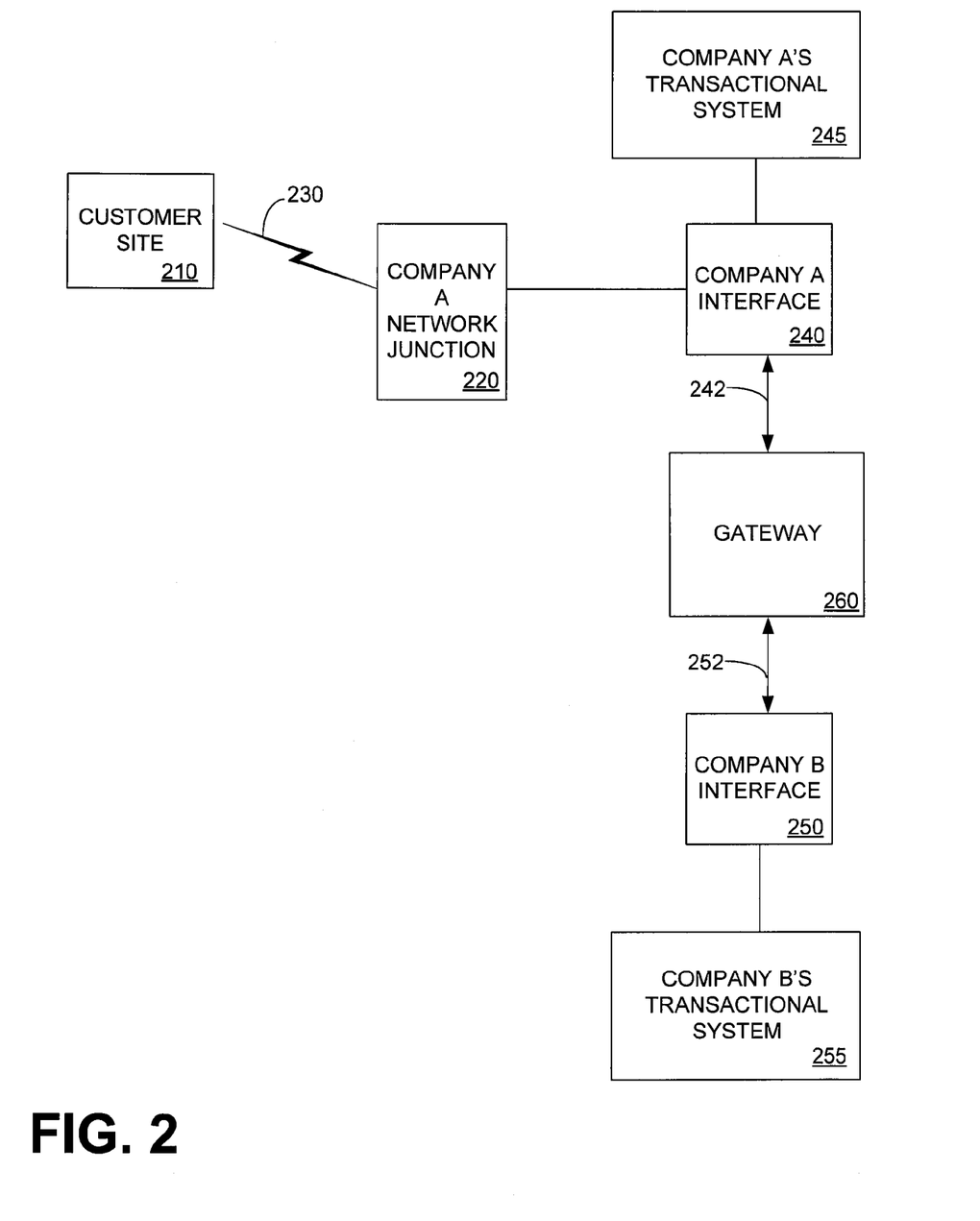
FIG. 2 is a block diagram depicting participants in a supply chain for a telecommunications service that utilizes the automated supply chain management gateway of FIG. 1.

As an example, consider the following scenario involving the supplying of a telecommunications service to a customer site 210, as depicted in FIG. 2. In this example, a customer is being provided access to a communications network being provided by Company A. To provide this service, the customer may be provided access to the Company A's network at a junction point 220 (e.g., a switch, router, multiplexer, or other device at edge of Company A's network). It is noted that, according to exemplary embodiments, Company A does not provide the physical wiring to provide this access. Company B, however, is a local telephone company in the proximity of the customer that may be able to connect the customer to Company A's network. Therefore, Company B can provide an access link 230 (e.g., wired or wireless circuit) used to connect with Company A's network.

In accordance with the present disclosure, Company A and Company B utilize interfaces 240, 250, respectively, to communicate with an automated supply chain management gateway 260 (which is similar to gateway 110) having a common platform. Each company also has transactional systems 245 (Company A), 255 (Company B) that perform business processes for the respective company. Therefore, referring to both FIGS. 1 and 2, using the concepts of the gateway 260, Company A may make an inquiry to Company B on whether Company B can provide an access line for the customer to Company A's network and at what cost and in what time frame. The inquiry is electronically sent from Company A to Company B using the automated supply chain management gateway platform over network communications, 242, 252 such as the Internet. Accordingly, Company B sends a response back to Company A using the automated supply chain management gateway platform.

Therefore, using the automated supply chain management gateway platform, Company A can identify a trading partner or supplier, in a particular country, that uses a particular technology, at an acceptable cost that meets Company A's needs. Company A can send requests out to other trading partners that have adopted interfaces compliant with gateway standards and select a supplier that offers the best solution. And, the lines of communication can be provided electronically, in lieu of telephone calls, as an example. Therefore, Company A can electronically communicate with international companies and identify an access supplier and the supplier's service coverage and costs, as an example.

After Company A identifies a trading partner (e.g., Company B), Company A can issue an order 160 to Company B to provide the agreed upon service. In earlier systems, this was typically done manually (e.g., sent via email, over phone, fax, regular mail, visit the partner's website and fill out a form, etc.). However, using the automated supply chain management gateway 260, the order can be issued electronically to company B. The order is received by Company B's interface 250 to their system and contains details of the requested service.

In earlier systems, information on what is happening with or a status of an order is not easily provided. Generally, a call had to be made to a trading partner or an email has to be sent to verify that an order has been accepted and that service will be confirmed to be provided.

Using the automated supply chain management gateway platform, after an order is issued to Company B, Company A can request status updates from Company B. This is accomplished using the common platform utilized by the respective interfaces. Accordingly, the automated supply chain management gateway platform may be characterized by status reports being provided in response to new updates, such as an update made on a service order.

Further, once certain milestones are reached, status reports 170 may be automatically sent from Company B to Company A in accordance with a defined supply chain workflow. Therefore, once the order is accepted, a status report may be sent to Company A. The status report may specify that the scheduled installation date for the service has changed from the initial date of May $30^{th}$ to June $5^{th}$. This may all automatically reported based on the issuance of the initial order.

Additional status or tracking reports may also be generated. For example, when the trading partner has finished a design for the scheduled service, a report may be automatically generated and electronically sent to Company A. This may be of importance to Company A to let the company know that the partner has the necessary design.

Further, when the trading partner (Company B) has installed the customer's equipment at a local central office 220, a status report may be sent to Company A. This may be another important milestone for Company A. The status report is sent electronically in accordance with the automated supply chain management gateway 260, without the need for telephone dialogue.

Additionally, the underlying platform of an interface to the automated supply chain management gateway 260 may allow for forwarding of the status report to a responsible party, such as a sales representative or the customer itself. For example, Company A may receive a status report and then relay the report to a desired party over different types of methodologies such as email, telephone call, voice mail message, etc. Each interface to the gateway platform may have such capabilities as part of a common platform.

Another important milestone in completion of the service by the trading partner is installation of the service at the customer's location. Upon generation and receipt of such a status report by Company A, the interface 240 used by Company A may automatically test the installed service. For example, a testing signal can be sent over the installed line to the customer's location and returned to Company A. If the installed service is successfully tested, Company A can automatically accept the service performed by the trading partner (Company B) and inform the partner that they may bill Company A for the service. This is all done without any technicians being dispatched or having to be online. Rather, it is an automatic function of the automated supply chain management gateway platform.

Further, if testing of the service fails, Company A can automatically and electronically notify Company B of the failure. This may allow Company B to fix the problem and then re-notify Customer A of the next milestone (e.g., service is completed). Company A may then automatically test the service and report the results back to Company B using the automated supply chain management gateway 260.

Once Company A accepts service from Company B, Company A may automatically notify the end customer of the completed service by Company A and ask the end customer to accept service over the platform. Further, the customer may be notified of when to expect billing for the service.

From inception of the service request to Company A to completion of the service by Company A, minimal human intervention is involved in issuing the order, tracking the order, and reporting in the above-described embodiment. The automated supply chain management gateway platform is designed to automatically perform such actions.

Additional actions performed under the platform include generation of billing invoices. While today, bills for services are provided in many different mediums, including paper, attachment in email, CDROM via postal mail, website, in accordance with the present disclosure, the automated supply chain management gateway platform provides for acceptance of invoices electronically by respective interfaces. After receipt of invoice 190 by the interface of Company A, the interface and related applications may input the invoice, where the invoice is authenticated, validated, and payment 195 is authorized electronically. Therefore, the trading partner or supplier may receive payment in a short turnaround after the invoice is sent from the trading partner.

An additional function of the automated supply chain management gateway platform is trouble reporting. For example, a common function of the interface to automated supply chain management gateway platform is trouble ticketing 198. Here, a customer or other interested party can place a request for service or maintenance, electronically. The request is referred as a trouble ticket. The trouble ticket is dispersed to a responsible party that attempts to isolate where the problem resides. It may be that the problem resides on the trading partner's (Company B) network or equipment. If this is the case, Company A can automatically send the trouble ticket to Company B's interface, where Company B will input the ticket into their trouble ticket system. Accordingly, Company B may investigate the problem, clear the trouble, and report that the problem is fixed to Company A.

Company A may then automatically test the network/equipment upon a report that the problem is fixed. If Company A verifies the remedy, Company A may automatically authorize the trading partner to clear the trouble ticket. Further, Company A can automatically notify a responsible party, such as the sales representative or end customer that the trouble is cleared.

Accordingly, validation, verification and synchronization between internal functional databases of a company (e.g., Company A) and external databases, such as from trading partners or suppliers (e.g., Company B), help provide identification of a low cost supplier; shortened servicing cycle time; decreased human intervention; decreased defects and rework; decreased cost of servicing; increased profit margin; and high value to both a trading partner and customer.

Figure 3:
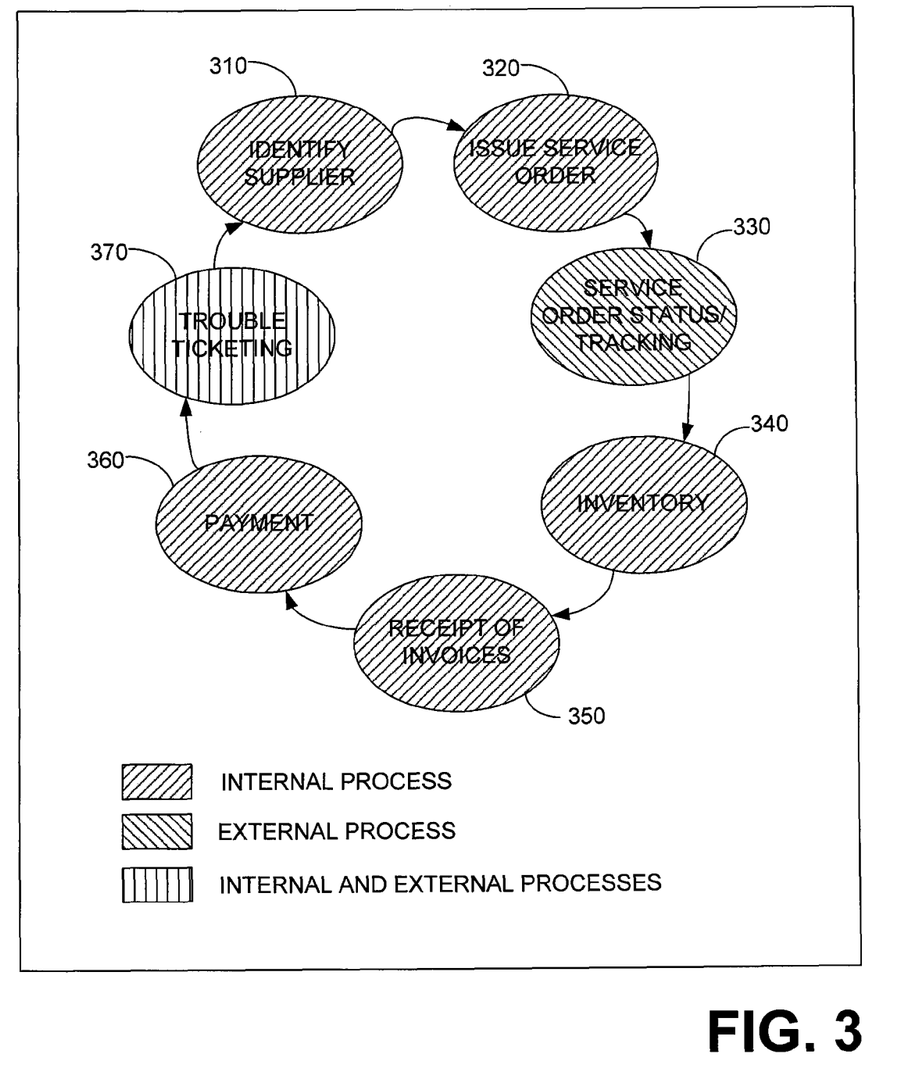
FIG. 3 is a diagram of business processes facilitated by an embodiment of the automated supply chain management gateway of FIG. 1.

Referring now to FIG. 3, a diagram is shown of some, among others, of the business processes facilitated by an embodiment of the automated supply chain management gateway 260. These are the same processes previously described with respect to FIGS. 1A-1B.

It is noted that individual processes may be implemented or deployed by an individual trading partner. For example, the process of identifying a supplier 310 is shown as being implemented by an internal process with respect to a trading partner. This trading partner and its business systems also implement the processes of issuing a service order 320, maintaining inventory 340, receiving invoices 350, and making payments 360. An external process performed by another trading partner is shown to be the process of tracking order status 330, while the process 370 involving trouble ticketing may be performed by both internally and externally by the respective trading partners. This serves to show that different trading partners may be involved in different processes that constitute the functionality of an embodiment of the automated supply chain management gateway 260. Further, trading partners may utilize existing siloed systems solutions and expand them for a full end to end solution represented by the automated supply chain management gateway 260. A respective interface to the gateway 260 may convert the language used by the respective business into language accepted by the gateway 260. Accordingly, the automated supply chain management gateway 260 establishes functions that are to be understood and performed by interfaces utilizing the gateway framework.

Figure 4:
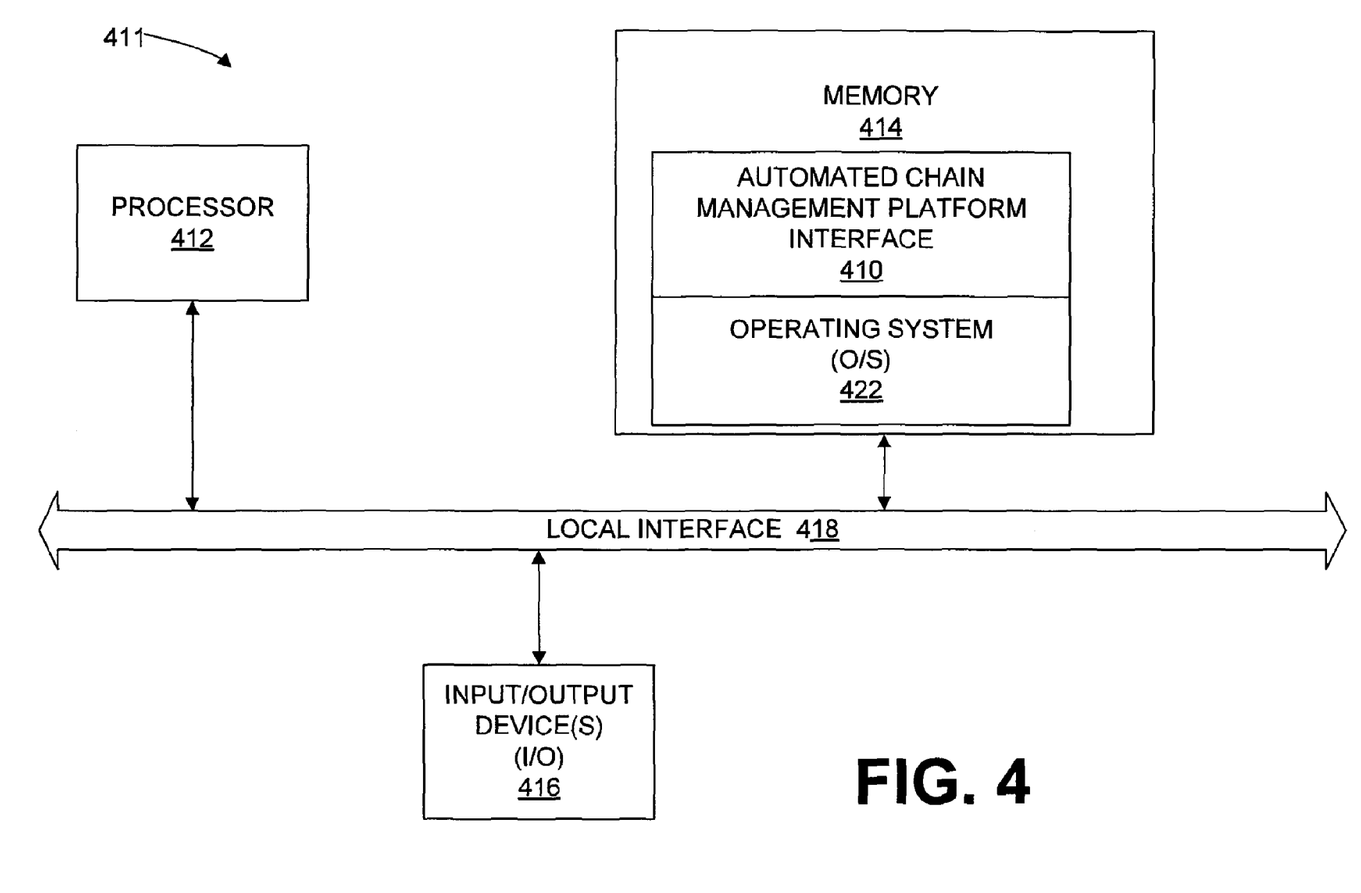
FIG. 4 is a block diagram of a computer which can implement an automated supply chain management gateway interface of the present disclosure.

The automated supply chain management gateway platform interface can be implemented in software (e.g., firmware), hardware, or a combination thereof. In one embodiment, the automated supply chain management gateway system is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the automated supply chain management gateway platform interface of the present disclosure is shown in FIG. 4. In FIG. 4, the automated supply chain management gateway platform interface is denoted by reference numeral 410.

Generally, in terms of hardware architecture, as shown in FIG. 4, the computer 411 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially available processor, a central processing unit (CPU), an auxiliary processor among several processors associated with the computer 411, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the automated supply chain management gateway interface 410 in accordance with the present disclosure and a suitable operating system (O/S) 422. A nonexhaustive list of examples of suitable commercially available operating systems 22 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 422 controls the execution of other computer programs, such as the automated supply chain management gateway interface 410, and provides scheduling, input-output control, file and data management, memory management, and communication control and related services.

In one embodiment, the automated supply chain management gateway interface 410 is a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the automated supply chain management gateway interface 410 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 411 is a PC, workstation, or the like, the software in the memory 414 may further include a basic input output system (BIOS) (omitted for simplicity). The BIOS is a set of software routines that initialize and test hardware at startup, start the O/S 422, and support the transfer of data among the hardware devices. The BIOS is stored in ROM so that the BIOS can be executed when the computer 411 is activated.

When the computer 411 is in operation, the processor 412 is configured to execute software stored within the memory 414, to communicate data to and from the memory 414, and to generally control operations of the computer 411 pursuant to the software. The automated supply chain management gateway interface 410 and the O/S 422, in whole or in part, but typically the latter, are read by the processor 412, perhaps buffered within the processor 412, and then executed.

When the automated supply chain management gateway interface 410 is implemented in software, as is shown in FIG. 4, it should be noted that the automated supply chain management gateway interface 410 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The automated supply chain management gateway interface 410 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the automated supply chain management gateway interface 410 is implemented in hardware, the automated supply chain management gateway interface 410 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
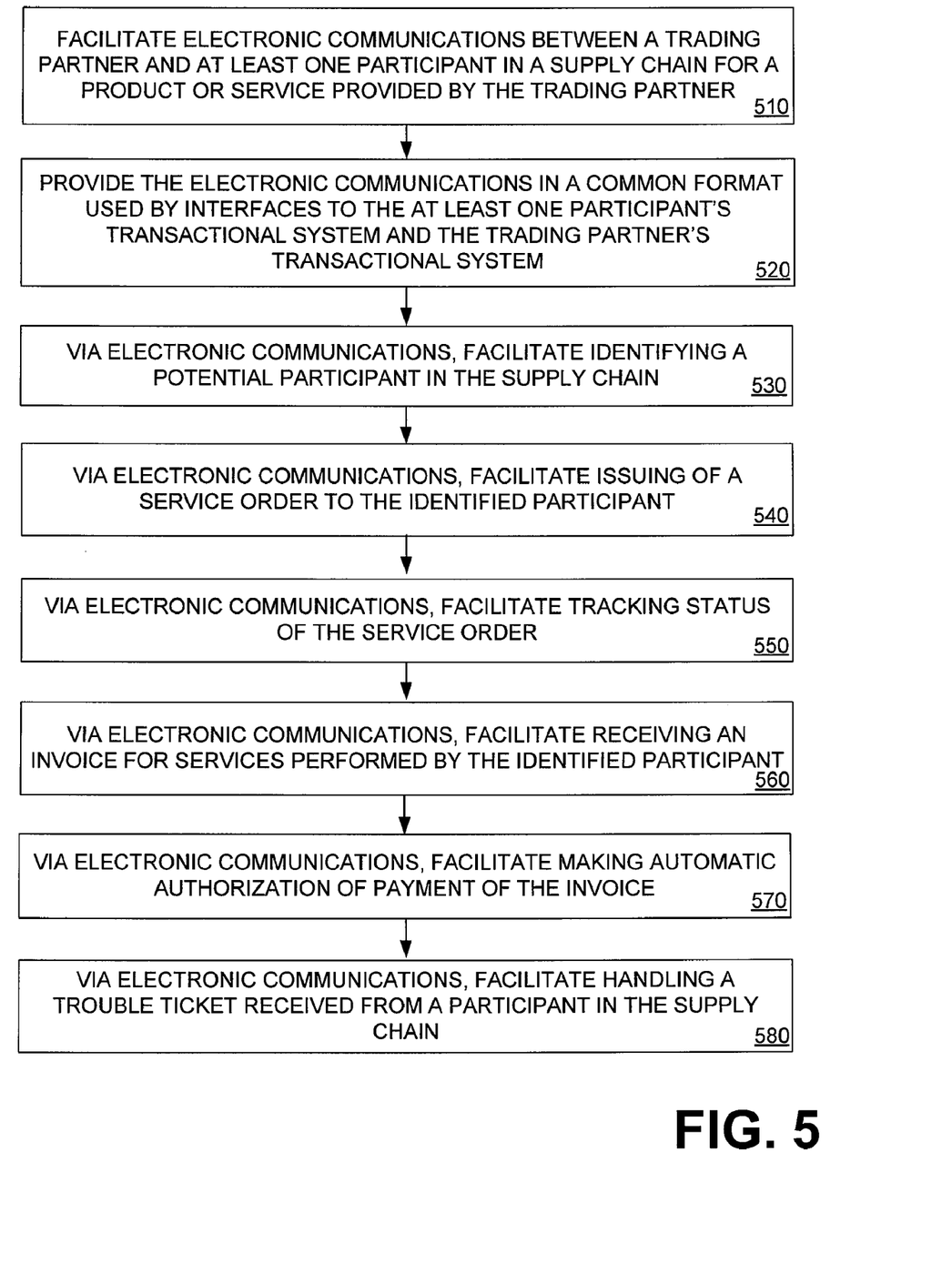
FIG. 5 is a flow chart diagram of a possible implementation of the automated supply chain management gateway of FIG. 1.

The flow chart of FIG. 5 shows the architecture, functionality, and operation of an exemplary implementation of the automated supply chain management gateway of the present disclosure. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved.

In FIG. 5, electronic communications are facilitated (510) between a trading partner and at least one participant in a supply chain for a product or service provided by the trading partner. The electronic communications are provided (520) in a common format used by interfaces to the at least one participant's transactional system and the trading partner's transactional system. The electronic communications comprise at least automated messages providing a current progress of the supply chain. Accordingly, the electronic communications facilitate operations performed in the supply chain. The operations include identifying (530) a potential participant in the supply chain; issuing (540) of a service order to the identified participant; and tracking (550) status of the service order. The operations further include receiving (560) an invoice for services performed by the identified participant; making (570) automatic authorization of payment of the invoice; and handling (580) a trouble ticket received from a participant in the supply chain.

In one embodiment, the aforementioned operations include operations performed by the trading partner's transactional system and operations performed by the at least one participant's transactional system. Further, completion of an operation by the participant's transactional system within the supply chain automatically initiates an operation being performed by the trading partner's transactional system within the supply chain.

It should be emphasized that the above-described embodiments of the present disclosure are merely possible examples of implementations, merely set forth for a clear understanding of the principles of the disclosure. Many variations and modifications may be made to the above-described embodiment(s) of the present disclosure without departing substantially from the spirit and principles of the disclosure. All such modifications and variations are intended to be included herein within the scope of this disclosure.

The invention claimed is:

1. An automated supply chain management system comprising:

an interface to a first transactional system of a trading partner, wherein the first transactional system of the trading party receives a request for installation of a network service;

at least one computer implementing the interface, wherein the first transactional system and the at least one computer resides on a first computer network;

a first gateway interface to the first transactional system of the trading partner, wherein the first gateway interface provides electronic communications between a participant in a supply chain used in installing the network service and the trading partner, the electronic communications being provided to the trading partner in a first format used by the first transactional system of the trading partner;

a second gateway interface to a second transactional system of the participant, wherein the second gateway interface provides electronic communications between the trading partner and the participant, the electronic communications being provided to the participant in a second format used by the second transactional system of the participant, wherein the second transactional system resides on a second computer network and the first gateway interface converts the electronic communications from a first language in the first format used by the first transactional system to a common language and format used by the first gateway interface and the second gateway interface, wherein the second gateway interface converts the electronic communications from the common language and format used by the first gateway interface and the second gateway interface to a second language in the second format used by the second transactional system, the electronic communications comprising at least automated messages providing a current progress of the supply chain, wherein an operation performed by the first transactional system of the trading partner cascades with an operation automatically performed by the second transactional system of the participant, a cascading operation corresponding to an event which is designated to occur upon completion of an earlier operation, wherein the interface to the first transactional system of the trading partner generates a testing signal to test successful installation of at least a portion of the network service installed by the participant, wherein completion of the network service by the trading partner is contingent on the successful installation by the participant, wherein in response to a successful testing of the installation, the trading partner is automatically notified by the first transactional system to bill the customer for completion of the network service requested, wherein in response to a failed testing of the installation, the participant is automatically notified by the first transactional system of the trading partner to fix the installation of at least the portion of the network installed by the participant.

2. The system of claim 1, wherein the electronic communications facilitate operations performed in the supply chain, the operations including:

identification of a potential participant in the supply chain, the potential participant comprising the participant;

issuing of a service order to the potential participant identified; and tracking status of the service order.

3. The system of claim 2, wherein the operations further include:

receiving an invoice for services performed by the potential participant identified; and making automatic authorization of payment of the invoice.

4. The system of claim 2, wherein the operations further include:

receiving a trouble ticket from the participant in the supply chain.

5. The system of claim 1, wherein the electronic communications facilitate operations performed in the supply chain, the operations including operations performed by the first transactional system of the trading partner and operations performed by the second transactional system of the participant.

6. The system of claim 5, wherein completion of an operation by the second transactional system of the participant within the supply chain automatically initiates an operation being performed by the first transactional system of the trading partner within the supply chain.

7. An automated supply chain management method comprising:

facilitating electronic communications between a trading partner and a participant in a supply chain for a network service provided by the trading partner, whereby the electronic communications are provided in a common format used by first and second gateway interfaces to a participant's first transactional system and a trading partner's second transactional system, wherein the first transactional system resides on a first computer network and the second transactional system resides on a second computer network;

converting the electronic communications from a first language in a first format used by the first transactional system to a common language and format used by the first gateway interface and the second gateway interface;

converting the electronic communications from the common language and format used by the first gateway interface and the second gateway interface to a second language in a second format used by the second transactional system, the electronic communications comprising at least automated messages providing a current progress of the supply chain, wherein an operation performed by the second transactional system of the trading partner cascades with an operation automatically performed by the first transactional system of the participant, a cascading operation corresponding to an event which is designated to occur upon completion of an earlier operation; and receiving, by the first transactional system of the participant, a request for installation of the network service from a customer;

generating a testing signal to test successful installation of at least a portion of the network service installed by the trading partner, wherein completion of the network service by the partner is contingent on the successful installation by the trading partner, in response to a successful testing of the installation, automatically notifying the participant by the first transactional system to bill the customer for completion of the network service requested, and in response to a failed testing of the installation, automatically notifying the trade partner by the first transactional system of the participant to fix the installation of at least the portion of the network installed by the trading partner.

8. The method of claim 7, wherein the electronic communications facilitate operations performed in the supply chain, the operations including:

identifying a potential participant in the supply chain, the potential participant comprising the participant;

issuing of a service order to the potential participant identified; and tracking status of the service order.

9. The method of claim 8, wherein the operations further include:

receiving an invoice for services performed by the potential participant identified; and making automatic authorization of payment of the invoice.

10. The method of claim 8, wherein the operations further include:

receiving a trouble ticket from the participant in the supply chain.

11. The method of claim 8, wherein the tracking status of the service order comprises receiving notification of completion of service by the participant in the supply chain.

12. The method of claim 7, wherein the electronic communications facilitate operations performed in the supply chain, the operations including operations performed by the trading partner's second transactional system and operations performed by the participant's first transactional system.

13. The method of claim 12, wherein completion of an operation by the participant's transactional system within the supply chain automatically initiates an operation being performed by the trading partner's second transactional system within the supply chain.

14. A computer readable medium embedded with an automated supply chain management computer program comprising instructions for:

facilitating electronic communications between a trading partner and a participant in a supply chain for a network service provided by the trading partner, whereby the electronic communications are provided in a common format used by first and second gateway interfaces to a participant's first transactional system and a trading partner's second transactional system, wherein the first transactional system resides on a first computer network and the second transactional system resides on a second computer network;

converting the electronic communications from a first language in a first format used by the first transactional system to a common language and format used by the first gateway interface and the second gateway interface;

converting the electronic communications from the common language and format used by the first gateway interface and the second gateway interface to a second language in a second format used by the second transactional system, the electronic communications comprising at least automated messages providing a current progress of the supply chain, wherein an operation performed by the second transactional system of the trading partner cascades with an operation automatically performed by the first transactional system of the participant, a cascading operation corresponding to an event which is designated to occur upon completion of an earlier operation; and receiving, by the first transactional system of the participant, a request for installation of the network service from a customer;

generating a testing signal to test successful installation of at least a portion of the network service installed by the trading partner, wherein completion of the network service by the partner is contingent on the successful installation by the trading partner, in response to a successful testing of the installation, automatically notifying the participant by the first transactional system to bill the customer for completion of the network service requested, and in response to a failed testing of the installation, automatically notifying the trade partner by the first transactional system of the participant to fix the installation of at least the portion of the network installed by the trading partner.

15. The computer readable medium of claim 14, wherein the electronic communications facilitate operations performed in the supply chain, the operations including:

identifying a potential participant in the supply chain, the potential participant comprising the participant;

issuing of a service order to the potential participant identified; and tracking status of the service order.

16. The computer readable medium of claim 15, wherein the operations further include:

receiving an invoice for services performed by the potential participant identified; and making automatic authorization of payment of the invoice.

17. The computer readable medium of claim 15, wherein the tracking status of the service order comprises receiving notification of completion of service by the participant in the supply chain.

18. The computer readable medium of claim 14, wherein the operations further include:
   receiving a trouble ticket from the participant in the supply chain.

19. The computer readable medium of claim 13, wherein the electronic communications facilitate operations performed in the supply chain, the operations including operations performed by the trading partner's second transactional system and operations performed by the participant's first transactional system.

20. The computer readable medium of claim 19, wherein completion of an operation by the participant's second transactional system within the supply chain automatically initiates an operation being performed by the trading partner's first transactional system within the supply chain.

\* \* \* \* \*